No. 662,673. Patented Nov. 27, 1900.
A. V. & J. T. HYSORE.
DRIER.
(Application filed May 26, 1900.)

(No Model.)

WITNESSES
E. J. Nottingham
G. F. Downing

INVENTORS
A. V. & J. T. Hysore
By H. A. Seymour
Attorney

UNITED STATES PATENT OFFICE.

ALPHENAS V. HYSORE AND JOHN T. HYSORE, OF PHILADELPHIA, PENNSYLVANIA.

DRIER.

SPECIFICATION forming part of Letters Patent No. 662,673, dated November 27, 1900.

Application filed May 26, 1900. Serial No. 18,128. (No model.)

*To all whom it may concern:*

Be it known that we, ALPHENAS V. HYSORE and JOHN T. HYSORE, residents of Philadelphia, in the county of Philadelphia and State of Pennsylvania, have invented certain new and useful Improvements in Extractors; and we do hereby declare the following to be a full, clear, and exact description of the invention, such as will enable others skilled in the art to which it appertains to make and use the same.

Our invention relates to an improvement in extractors, and more particularly to pneumatic extractors for extracting liquid from solids, the object of the invention being to provide an improved extractor which will be adapted for the reception of stock in one end and air under compression in the other end, the air being forced through the stock, serving to extract the liquid therefrom.

A further object is to provide an improved apparatus of the above-mentioned character which will be especially adapted for cleansing and drying stock of any character.

With these objects in view the invention consists in certain novel features of construction and combinations and arrangements of parts, as will be more fully hereinafter described, and pointed out in the claims.

Figure 1:
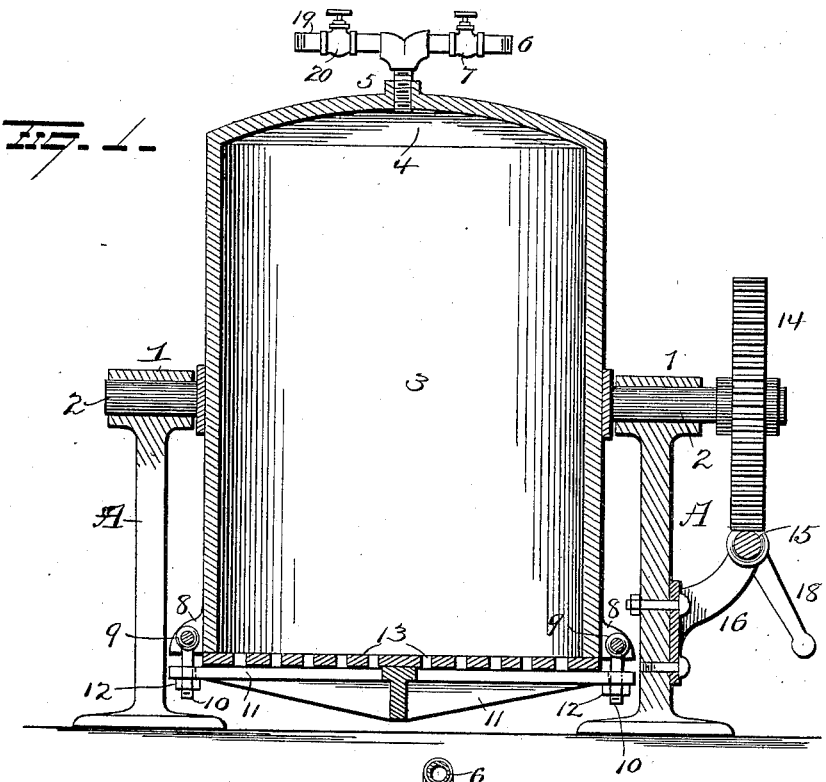
Figure 2:
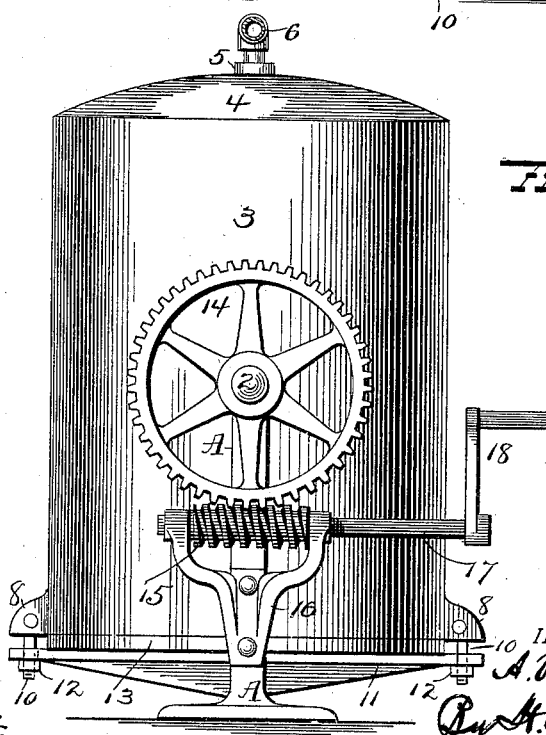

In the accompanying drawings, Figure 1 is a view in section illustrating our improvements, and Fig. 2 is a view in elevation taken at right angles to Fig. 1.

A A represent two standards having enlarged lower ends secured to the floor and provided at their upper ends with alined bearings 1 for oppositely-disposed trunnions 2, secured between the ends of a tank or receptacle 3, open at its lower end and provided at its upper end with a semispherical closed top 4. The top 4 is provided with a hollow threaded boss 5, in which one end of an air-supply pipe 6 is screwed and provided with a suitable valve 7 to regulate the passage of air therethrough.

The lower end of the tank or receptacle 3 is made at equidistant points around its periphery with enlargements 8, having sockets therein for the reception of spherical heads 9 on threaded bolts 10, the threaded ends of which project through the slotted ends of a cross-brace 11 and provided at their lower ends with nuts 12, screwed on said bolts to securely hold a perforated plate 13 between said brace and the open lower end of the tank or receptacle 3.

The trunnion 2 on one side of the tank or receptacle 3 projects beyond its bearing 1 and has secured thereon a worm-wheel 14, which meshes with a worm 15, mounted in a bracket 16, secured to the standard A, and said worm is secured to a shaft 17, projecting to one side of the bracket 16 and provided on one end with a crank 18 for turning the same.

A liquid-supply pipe 19 communicates with the air-inlet pipe 6 and is provided with a suitable valve 20 to regulate the passage of liquid therethrough.

The operation of our improvements is as follows: When it is desired to place material into the tank or receptacle 3, the crank 18 is operated to turn the worm 15 and transmit motion to the worm-wheel to rotate the same and turn the tank or receptacle upside down, when the brace 11 and perforated plate 13 can be removed by simply loosening the nuts 12 and swinging the bolts 10 out of the slots in the brace. The material or stock to be treated is now placed in the receptacle, the perforated plate 13 and brace 11 replaced, and the receptacle turned to its former position by means of the crank above described. The air-pipe 6 is now screwed into the boss 5 and the valve 7 turned to admit air under pressure into the receptacle on top of the material to be treated, and as the pressure of air increases it will pass through the material and out through perforated plate 13 and carry with it practically all moisture in the material, leaving the same practically dry; but in order to absolutely insure the complete drying of the material the compressed air can be heated to the desired temperature before being admitted into the receptacle. When the material is thoroughly dry, the receptacle can be given a quarter-turn, the brace 11 and plate 13 removed, and the pressure of air behind the material will force the latter out.

When the material to be treated should be cleansed before drying, the valve 20 in liquid-pipe 19 will be opened simultaneously with the valve 7 in air-pipe 6, and the compressed air passing over pipe 19 will atomize the liquid, or, in other words, be thoroughly impregnated therewith, and as the mixed air and liquid passes through the material to be treated it will thoroughly cleanse the same, when the valve in liquid-pipe 19 can be closed and the dry air passed through the material to remove any moisture deposited during the cleansing operation.

Various slight changes might be resorted to in the general form and arrangement of the several parts described without departing from the spirit and scope of our invention, and hence we would have it understood that we do not wish to limit ourselves to the precise details set forth, but consider ourselves at liberty to make such slight changes and alterations as fairly fall within the spirit and scope of our invention.

Having fully described our invention, what we claim as new, and desire to secure by Letters Patent, is—

1. In an extractor, a receptacle open at one end provided with a perforated head extending across said open end, said receptacle provided at its other end with an inlet for compressed air.

2. An extractor consisting of an invertible receptacle open at one end, a removable perforated head extending across said open end and an air-inlet at the other end of the receptacle.

3. In an extractor, the combination of a receptacle open at one end and revolubly supported, means for rotating the same, a perforated plate removably secured on the open end of said receptacle and extending across said open end and means at the closed end of said receptacle for admitting air under pressure.

4. In an extractor, the combination with standards, of a tank or receptacle open at one end and revolubly supported on said standards, socketed enlargements at the open end of said tank or receptacle, bolts connected with said enlargements, a cross-brace adapted to be secured over the open end of said receptacle by means of nuts on said bolts, and a perforated plate secured between the open end of the receptacle and the brace and extending across said open end, and means at the closed end of said tank for the attachment of an air-inlet pipe.

5. An extractor comprising a cylinder closed at one end and having an opening at its other end equal in diameter to the diameter of the cylinder, a perforated plate removably attached to the cylinder and extending across said open end thereof and an inlet-pipe communicating with the other end of said cylinder.

6. In an extractor, the combination with a receptacle for material to be treated, of means for permitting the entrance into said receptacle of mixed air and liquid under pressure to pass through the material in said receptacle and means for permitting the discharge of the air and moisture containing the foreign substance extracted from the material treated.

In testimony whereof we have signed this specification in the presence of two subscribing witnesses.

ALPHENAS V. HYSORE.
JOHN T. HYSORE.

Witnesses:
JOHN P. ADAMS,
ALFRED H. DAWSON.